US012679353B2

(12) United States Patent
Clawson et al.

(10) Patent No.: US 12,679,353 B2
(45) Date of Patent: Jul. 14, 2026

(54) COLLISION AVOIDANCE WITH TRAJECTORY EVALUATION

(71) Applicant: Zoox, Inc., Foster City, CA (US)

(72) Inventors: Taylor Scott Clawson, Hyde Park, UT (US); Olivier Amaury Toupet, Escondido, CA (US); Varun Agrawal, Mountain View, CA (US); Leonardo Poubel Orenstein, Foster City, CA (US); Jonathan Scott Mcneely, Castro Valley, CA (US)

(73) Assignee: Zoox, Inc., Foster City, CA (US)

( * ) Notice: Subject to any disclaimer, the term of this patent is extended or adjusted under 35 U.S.C. 154(b) by 203 days.

(21) Appl. No.: 18/193,285

(22) Filed: Mar. 30, 2023

(65) Prior Publication Data
US 2024/0326791 A1 Oct. 3, 2024

(51) Int. Cl.
*B60W 30/095* (2012.01)
*B60W 30/09* (2012.01)
*B60W 40/06* (2012.01)

(52) U.S. Cl.
CPC ........ *B60W 30/0953* (2013.01); *B60W 30/09* (2013.01); *B60W 30/0956* (2013.01); *B60W 40/06* (2013.01); *B60W 2552/00* (2020.02); *B60W 2554/80* (2020.02)

(58) Field of Classification Search
CPC ............. B60W 30/0953; B60W 30/09; B60W 30/0956; B60W 40/06; B60W 2552/00; B60W 2554/80
See application file for complete search history.

(56) References Cited

U.S. PATENT DOCUMENTS

| | | | | |
|---|---|---|---|---|
| 2013/0024075 A1* | 1/2013 | Zagorski | ................... | B60T 7/22 |
| | | | | 701/1 |
| 2017/0183004 A1 | 6/2017 | Bonarens et al. | | |
| 2021/0114617 A1* | 4/2021 | Phillips | .............. | G01C 21/3453 |
| 2022/0055616 A1* | 2/2022 | King | ..................... | B60W 30/09 |
| 2022/0153234 A1* | 5/2022 | Shimizu | ............... | B60W 30/09 |
| 2024/0124060 A1* | 4/2024 | Giordano | ........... | B60W 10/184 |

FOREIGN PATENT DOCUMENTS

| | | |
|---|---|---|
| CN | 114489087 A | 5/2022 |
| CN | 114559934 A | 5/2022 |
| EP | 4053666 A1 | 9/2022 |
| JP | 2011028609 A | 2/2011 |

OTHER PUBLICATIONS

Search Report and Written Opinion for International Application No. PCT/US2024/022267, Dated Jul. 22, 2024, 12 pages.

* cited by examiner

*Primary Examiner* — Dylan M Katz
(74) *Attorney, Agent, or Firm* — Lee & Hayes, P.C.

(57) ABSTRACT

Techniques for determining an optimal trajectory for a vehicle are discussed herein. In some cases, the described techniques include receiving, from a first computing system and by a second computing system (e.g., a computing system associated with a trajectory validation system of the vehicle), a primary trajectory and an alternative trajectory for the vehicle. In some cases, the second computing system is configured to select or otherwise determine whether to select the primary trajectory, the alternative trajectory, or neither trajectory for the vehicle. In some cases, the alternative trajectory is determined by applying a lateral swerve to the primary trajectory.

20 Claims, 6 Drawing Sheets

200

RECEIVE A FIRST TRAJECTORY
202

VALIDATE THE TRAJECTORY
204

COLLISION?
206

No

Yes

SELECT THE FIRST TRAJECTORY
208

COLLISION TIME <
THRESHOLD?
210

No

Yes

REJECT THE FIRST TRAJECTORY
212

400 ⤵

500 ⟶

DETERMINE THE PRIMARY TRAJECTORY
502

DETERMINE A LATERAL SWERVE MAGNITUDE
504

DETERMINE AN ALTERNATIVE TRAJECTORY
506

VALIDATE BOTH TRAJECTORIES
508

SELECT AN OPTIMAL TRAJECTORY
510

CONTROL THE VEHICLE BASED ON THE OPTIMAL TRAJECTORY
512

COLLISION AVOIDANCE WITH TRAJECTORY EVALUATION

BACKGROUND

Safety of passengers in a vehicle and other people or objects in proximity to the vehicle is of the upmost importance. Such safety is often predicated on an accurate detection of a potential collision and timely deployment of a safety measure. While autonomous vehicles are often implemented with systems that have highly effective collision detection systems, these systems may be inoperable or ineffective on rare occasions. For instance, an error may be introduced into a relatively long processing pipeline for a system on a vehicle, causing the system to generate a trajectory that would collide with an object and/or attempt to maneuver the vehicle in a manner that is not possible or is unacceptable given the current pose of the vehicle and/or capabilities of the vehicle. As such, the system may not operate as effectively as desired, which may result in unsafe behavior.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
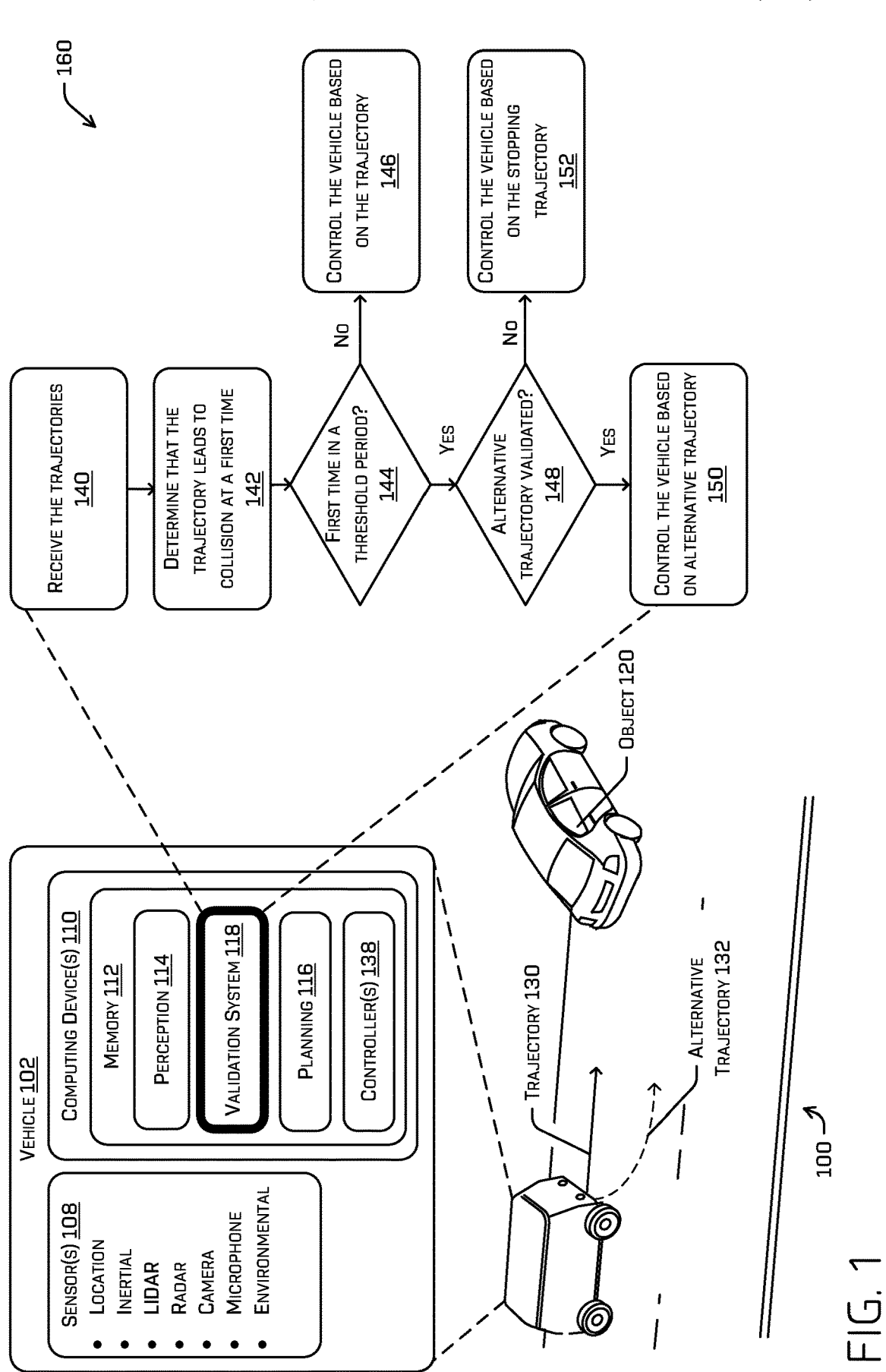
FIG. 1 illustrates an example environment in which the techniques described herein may be implemented.

This disclosure describes techniques for determining an optimal trajectory for a vehicle. In some cases, the described techniques include receiving, from a first computing system and by a second computing system (e.g., a computing system associated with a trajectory validation component of the vehicle), a plurality of trajectories (e.g., a primary trajectory and an alternative trajectory) for the vehicle. In some cases, the second computing system is configured to select the primary trajectory, the alternative trajectory, or neither trajectory for the vehicle. In some cases, the alternative trajectory is determined by applying a lateral swerve to the primary trajectory. In some cases, the primary trajectory and the alternative trajectory have different lateral profiles. A trajectory's lateral profile may describe a measure of where a vehicle following trajectory would be with respect to a lateral axis.

In at least some instances, such techniques may further ensure that the system does not respond to any "false positive events." As a non-limiting example of a false positive event, a system may evaluate all points along a trajectory, where at least some such points may be reached later the future relative to the frequency with which the trajectory is received. In such examples, a collision avoidance process may be conservatively initiated based on a predicted collision at least one such point. These collision avoidance processes, while designed for the safety of the passenger, may be associated with uncomfortable accelerations, increased compute, the need for remote assistance, and may cause unintended consequences for other drivers. As will be discussed herein, the techniques provided may allow the system to receive a new trajectory for evaluation prior to activating such processes if a predicted collision is far enough out in the future. For example, in some cases, the second computing system may determine that the primary trajectory is predicted to lead to collision at a first time in the future. In some of such cases, the second computing system may then determine whether the first time is outside of a threshold time period. For example, the threshold time period may be determined based on a time period that the first computing system is expected to take to generate a new primary trajectory as well as a buffer period. In some cases, based on (e.g., in response to) determining that the first time is outside of the threshold time period, the second computing system recommends that the vehicle is controlled based on the primary trajectory despite the predicted collision. In some cases, based on determining that the first time is inside the threshold time period, the second computing system recommends that the vehicle is controlled based on the alternative trajectory, because the primary trajectory is predicted to lead to a sufficiently imminent collision.

As another example, in some cases, if the second computing system determines that the primary trajectory is predicted to lead to collision and the alternative trajectory is not predicted to lead to collision, the second computing system recommends that the vehicle is controlled based on the alternative trajectory until a new primary trajectory is received from the first computing system. The objective behind this temporary selection of the alternative trajectory may be to avoid a predicted collision that the first computing system may have missed in validating the primary trajectory, but also to defer to the first computing system after the first computing system generates a new primary trajectory. In some cases, the design principle behind imposing this deference on the second computing system with respect to the first computing system may be to provide the first computing system with maximal opportunity to direct the vehicle and to use the second computing system as a safety check on the operations of the second computing system. This may be because the first computing system is expected to have additional computational resources, higher predictive accuracy, and/or a larger set of sensory inputs relative to the second computing system.

As an additional example, in some cases, if the second computing system determines that both the primary trajectory and the alternative trajectory are predicted to lead to collision, the second computing system recommends controlling the vehicle based on a stopping trajectory that is configured to lead the vehicle to stop. In some cases, the second computing system determines whether a trajectory is predicted to lead to collision based on whether the trajectory is predicted to lead to collision at any point in the future. In some cases, the second computing system determines whether a trajectory is predicted to lead to collision based on whether the trajectory is predicted to collision at a time that is outside of a threshold time period. In some cases, the threshold time period may be determined based on a time period that the first computing system is expected to take to generate a new primary trajectory as well as a buffer period.

As the examples provided above illustrate, in some cases, described techniques may be used to select an optimal trajectory for the vehicle to increase the likelihood that the vehicle is operated in compliance with relevant traffic regulations and avoids collision with other objects in the vehicle environment. Accordingly, the techniques discussed herein may improve the safety of occupants of an autonomous vehicle that incorporates the techniques discussed herein. Moreover, the techniques may improve the efficiency of vehicle, such as an autonomous vehicle, in accomplishing a mission such as delivering passengers and/or cargo, surveying a region, or the like.

In some cases, the techniques described include equipping the vehicle with two separate computing systems each configured to generate and/or validate a trajectory for the vehicle: a first computing system and a second computing system. In some cases, the vehicle may include a vehicle safety system implemented separately from the vehicle computing device for improved performance of the vehicle safety system, and/or to provide redundancy, error checking, and/or validation of determinations and/or commands determined by the vehicle computing device. However, in other cases, the vehicle safety system may be implemented as one or more components within the same vehicle computing device. Additional examples of a vehicle architecture comprising a first computing system and a second computing system can be found, for example, in U.S. patent application Ser. No. 16/218,182 titled "Collision Avoidance System with Trajectory Validation" filed Dec. 12, 2018, U.S. patent application Ser. No. 16/232,863 titled "Collision Avoidance System" filed Dec. 26, 2018, and U.S. patent application Ser. No. 16/588,529 titled "Collision Avoidance Perception System" filed Sep. 30, 2019, the entirety of which are herein incorporated by reference.

The first computing system may generally perform processing to control how the vehicle maneuvers within an environment. The first computing system may implement various Artificial Intelligence (AI) techniques, such as machine learning, to understand an environment around the vehicle and/or instruct the vehicle to move within the environment. For example, the first computing system may implement the AI techniques to localize the vehicle, detect an object around the vehicle, segment sensor data, determine a classification of the object, predict an object track, generate a trajectory for the vehicle, and so on. In one example, the first computing system generates a primary trajectory for controlling the vehicle and an alternative trajectory for controlling the vehicle, and provides the primary trajectory and the alternative trajectory to the second computing system. The alternative trajectory may control the vehicle to come to a stop and/or to perform another maneuver (e.g., swerve to one side, lane change, etc.). In some cases, the first computing device is configured to determine that the first trajectory and the second trajectory are both free from collision prior to transmitting them to the second computing device.

The second computing system may generally evaluate the first computing system using at least a subset, which may include up to the full set, of data (e.g., sensor data) made available to the first computing system. For example, the second computing system may independently localize the vehicle by determining a position and/or orientation (together a pose) of the vehicle relative to a point and/or object in an environment where the vehicle is located. The second computing system may also independently detect an object around the vehicle and/or predict a trajectory for the object. The second computing system may use the pose of the vehicle and/or the predicted trajectory for the object to evaluate a trajectory of the vehicle provided by the first computing system and determine if the trajectory should be used to control the vehicle. Such localizations and/or detections may use similar techniques as used in the first computing system so as to verify the outputs thereof and/or use dissimilar techniques to ensure consistency and verifiability of such outputs.

To evaluate a trajectory of the vehicle, the second computing system may perform one or more operations to evaluate (or validate) the trajectory. For example, the second computing system may check to see if a trajectory was generated less than a threshold amount of time ago, if the trajectory is consistent with a current or previous pose of the vehicle (e.g., the trajectory controls the vehicle to be positioned at a location that is possible given the current pose of the vehicle), if the trajectory is compatible with a capability of the vehicle (e.g., steering limits, acceleration limits, etc.), and so on. Further, the second computing system may check to see if a trajectory is associated with a collision. For example, the second computing system may check to see if a trajectory of the vehicle provided by the first computing system intersects with a trajectory of an object determined by the second computing system and if the object and the vehicle meet at the intersection at the same time (or a window of time). That is, the second computing system may determine if the vehicle would collide with an object if the vehicle were maintained along the trajectory provided by the first computing system. Such collision checking may be based on either one or more of direct kinematic assumptions of travel and/or predictions of motion as determined by one or more additional techniques.

In some cases, relative to the second computing system, the first computing system is expected to have a higher predictive accuracy but a lower predictive frequency and/or responsiveness. This may be because the first computing system analyzes a larger set of sensory input data, uses more computationally complex processing operations, and/or uses more predictive models—each of which is a factor that may increase the predictive accuracy of trajectory evaluation outputs generated by the first computing system but may also cause the first computing system to be slower than the second computing system. In some cases, because the first computing system generates more predictively accurate trajectory evaluation outputs but does so at a slower pace, the secondary computing system is expected to be less accurate but more responsive than the first computing system. Accordingly, in some cases, the secondary computing system is used to validate operations of the first computing system.

In some cases, the second computing device includes a kinematics-based model and/or a dynamics-based model for evaluating whether at least one of the primary trajectory or the alternative trajectory is predicted to intersect with a predicted trajectory of an object at a window of time. In some cases, the kinematics-based model is configured to determine whether a trajectory of the vehicle is predicted to collide with an object based on a predicted direction of motion associated with the object. In some cases, the predicted direction of motion associated with the object is determined based on a past direction of motion associated with the object and an assumed future direction of motion associated with the object.

In some cases, the techniques described herein include generating a primary trajectory and an alternative trajectory using the first computing system. The primary trajectory may be a trajectory that is determined by the first computing system to be the optimal trajectory for the vehicle to select. The alternative trajectory may be another trajectory that is validated by the first computing system. In some cases, the alternative trajectory may be generated by modifying the primary trajectory in accordance with one or more geometric modifications. For example, the alternative trajectory may be generated by applying a lateral swerve to the primary category. In some cases, the alternative trajectory may be the trajectory that is determined by the first computing system to be the second-most optimal trajectory. For example, in some cases, the first computing system may determine a score for each candidate trajectory, select the highest-scoring trajectory as the primary trajectory, and select the second-highest-scoring trajectory as the alternative trajectory.

In some cases, the primary trajectory and the alternative trajectory are both generated by optimizing a lateral swerve variable during trajectory generation, for example by using a tree search algorithm. Exemplary techniques for trajectory generation and/or evaluation using tree search operations are described in greater detail in U.S. Pat. No. 11,360,477, entitled "Trajectory Generation using Temporal Logic and Tree Search," which is incorporated by reference herein in its entirety.

As described above, in some cases, the alternative trajectory is generated by modifying the primary trajectory in accordance with a geometric modification such as a lateral swerve. The modification may be performed by the first processing unit and during the trajectory generation process. In some cases, the alternative trajectory is substantially parallel to the primary trajectory but is positioned to one side of the primary trajectory based on a lateral swerve that is determined based on a lateral swerve magnitude. In some cases, to determine the alternative trajectory, the first computing system determines a maximal amount of lateral swerve that, when applied to the primary trajectory, still ensures that the resulting trajectory is valid. The maximum amount of lateral swerve may be determined in a manner to ensure a minimum distance with a lane boundary.

For example, in some cases, if the first computing system determines that the primary trajectory would still be validated if the primary trajectory laterally swerves to the right for up to a units and to the left for up to b units, and if a>b, then the first computing system may determine that the maximum amount of permissible lateral swerve is a units. In some cases, the first computing system determines the alternative trajectory by laterally swerving the primary trajectory by a lateral swerve magnitude that is determined based on (e.g., equal to) the maximum amount of permissible lateral swerve and in a lateral swerve direction that is determined based on a direction associated with the maximum amount. For example, in some cases, if the first computing system determines that the primary trajectory would still be validated if the primary trajectory laterally swerves to the right for up to a units and to the left for up to b units, and if a>b, then the first computing system may determine that the alternative trajectory is generated by laterally swerving the primary trajectory by a units to the right.

In some cases, the lateral swerve magnitude associated with the alternative trajectory is not allowed to exceed a threshold. For example, the threshold may be determined based on a distance between an estimated position of the vehicle when following the primary trajectory and an estimated position of a lane marking. In some cases, the lateral swerve magnitude associated with the alternative trajectory is determined in such a way that, when the vehicle follows the alternative trajectory, the vehicle is expected to remain within the lane at which the vehicle is traveling. In some cases, the lateral swerve magnitude associated with the alternative trajectory is determined in such a way that, when the vehicle follows the alternative trajectory, the vehicle is expected to remain within the lane at which the vehicle is traveling and have a threshold distance from the lane markings on one or both sides of the vehicle. In some cases, the lateral swerve threshold applied to the lateral swerve magnitude of the alternative trajectory is determined based on (e.g., based on a summation of): (i) a distance between an estimated position of the vehicle when following the primary trajectory and an estimated position of a lane marking, and/or (ii) a safety buffer distance.

In some cases, to determine the alternative trajectory, the first computing system determines a maximal amount of lateral swerve that: (i) when applied to the primary trajectory, still ensures that the resulting trajectory is valid, and (ii) is below a lateral swerve threshold. For example, if the first computing system determines that the primary trajectory would still be validated if the primary trajectory laterally swerves to the right for up to a units and to the left for up to b units, a>b, a falls below or meets a right swerve threshold $T_R$, and b falls below or meets a left swerve threshold $T_L$, then the first computing system may determine that the maximum amount of permissible lateral swerve is a units. However, if the first computing system determines that a>$T_R$ and b<$T_L$, then the first computing system may: (i) determine that the maximum amount of permissible lateral swerve is b units if b>($T_R$−a), and (ii) determine that the maximum amount of permissible lateral swerve is a units if b>($T_R$−b).

In some cases, subsequent to determining the maximum amount of permissible lateral offset threshold for the primary trajectory, the first computing system determines the alternative trajectory by laterally swerving the primary trajectory by a lateral swerve magnitude that is determined based on (e.g., is equal to) the maximum amount of permissible lateral swerve and in a lateral swerve direction that is determined based on a direction associated with the maximum amount. For example, if the first computing system determines that the primary trajectory would still be validated if the primary trajectory laterally swerves to the right for up to a units and to the left for up to b units, a>b, a falls below or meets a right swerve threshold $T_R$, and b falls below or meets a left swerve threshold $T_L$, then the first computing system may determine the alternative trajectory is generated by laterally swerving the primary trajectory by a units to the right. As another example, if the first computing system determines that the primary trajectory would still be validated if the primary trajectory laterally swerves to the right for up to a units and to the left for up to b units, a>b, a exceeds a right swerve threshold $T_R$, b falls below or meets a left swerve threshold $T_L$, and b>($T_R$−a), then the first computing system may determine the alternative trajectory is generated by laterally swerving the primary trajectory by b units to the left. As an additional example, if the first computing system determines that the primary trajectory would still be validated if the primary trajectory laterally swerves to the right for up to a units and to the left for up to b units, a>b, a exceeds a right swerve threshold $T_R$, b falls below or meets a left swerve threshold $T_L$, and b<($T_R$−a), then the first computing system may determine the alternative trajectory is generated by laterally swerving the primary trajectory by a units to the right.

Accordingly, in some cases, the alternative trajectory is generated by applying a lateral swerve to one direction in accordance with a lateral swerve magnitude, and the lateral swerve magnitude falls below or meets a lateral swerve threshold. In some cases, the lateral swerve threshold is the same for a lateral swerve to the right and for a lateral swerve to the right, while in other cases each direction is associated with a respective threshold. In some cases, if the vehicle is estimated to be in a location $(x_V, y_V)$, the right lane marking is estimated to be in a location $(x_R, y_R)$, and the left lane marking is estimated to be in a location $(x_L, y_L)$, then the right swerve threshold may be determined based on $|x_V-X_R|$ and then the left swerve threshold may be determined based on $|x_V-x_L|$. For example, the right swerve threshold may be determined based on $(|x_V-X_R|+B_R)$ and then the left swerve threshold may be determined based on $(|x_V-x_Z|+B_L)$, where $B_R$ may be a buffer distance for the right swerve and By may be a buffer distance for the left swerve that may be the same as or different from $B_R$. In some cases, $B_R$ is determined based on whether the lane to the right of the vehicle's current lane is estimated to occupy an object and/or a vehicle within a threshold longitudinal distance of $y_V$. In some cases, $B_L$ is determined based on whether the lane to the right of the vehicle's current lane is estimated to occupy an object and/or a vehicle within a threshold longitudinal distance of $y_V$.

In some cases, in addition to the primary trajectory and the alternative trajectory, the first computing system provides a stopping trajectory to the second computing system. In some cases, the stopping trajectory is configured to lead the vehicle to stop. In some cases, the first computing system validates the stopping trajectory. In some cases, the alternative trajectory also leads the vehicle to stop, but is different from the stopping trajectory provided and/or validated by the first computing system. In some cases, the alternative trajectory swerves the vehicle for a period of time and then stops the vehicle.

In some cases, the techniques described herein include evaluating the trajectories provided by the first computing system. In some cases, evaluating a trajectory includes determining whether the trajectory is predicted to lead to collision and determining whether to validate the trajectory based on whether the trajectory is predicted to lead to collision. In some cases, a trajectory is validated if the trajectory is predicted to not lead to collision. In some cases, a trajectory is not validated (e.g., rejected) if the trajectory is predicted to lead to collision.

In some cases, evaluating a trajectory includes determining whether the trajectory is predicted to lead to collision within a threshold time period and determining whether to validate the trajectory based on whether the trajectory is predicted to lead to collision within the threshold time period. In some cases, a trajectory is validated if the trajectory is predicted to not lead to collision within the threshold time period. In some cases, a trajectory is not validated (e.g., rejected) if the trajectory is predicted to lead to collision within the threshold time period.

In some cases, a trajectory is predicted to lead to collision during a time period if a probability that the trajectory will lead to collision during the time period exceeds a probability threshold. In some cases, the vehicle is controlled based on the primary trajectory if the trajectory based on determining that the probability that the trajectory will lead to collision during a threshold time period falls below a probability threshold. In some cases, determining that the probability falls below the probability threshold is based on (e.g., in response to) determining that the primary trajectory will lead to collision at a first time and that the first time meets or exceeds the threshold time period. In some cases, the probability may be determined based on at least one of a first speed of the autonomous vehicle, a second speed of an object associated with a predicted collision, a classification of the object, or an environment of the autonomous vehicle. In some cases, the probability may be determined based on at least one of a speed of the vehicle, an environment feature of an environment of the vehicle, a deceleration profile of the vehicle, a time-to-collision measure, a distance-to-collision measure, or a classification of an object associated with a predicted collision.

In some cases, the probability that the vehicle will collide with an object within a threshold time period may be determined based on a predicted trajectory of the object. For example, the object trajectory may be used to determine a second probability that the object exits an occlusion region. This second probability may then be used to determine the probability that the vehicle will collide with the object within the threshold time period In some cases, the second computing system evaluates a trajectory to determine whether the trajectory is predicted to lead to collision and, if so, when the trajectory is predicted to lead to collision. In some of such cases, if the second computing system determines that the trajectory is not predicted to lead to collision, the second computing system determines to validate the trajectory. In some cases, if the second computing system determines that the trajectory is predicted to lead to collision, the second computing system determines the first time associated with the predicted collision. In some cases, the second computing system may then determine whether the first time is outside of a threshold time period. For example, the threshold time period may be determined based on a time period that the first computing system is expected to take to generate a new primary trajectory as well as a buffer period. In some cases, based on determining that the first time is outside of the threshold time period, the second computing system recommends that the vehicle is controlled based on the primary trajectory despite the predicted collision. In some cases, based on determining that the first time is inside the threshold time period, the second computing system recommends that the vehicle is controlled based on the alternative trajectory, because the primary trajectory is predicted to lead to a sufficiently imminent collision.

In some cases, to validate a trajectory, the second computing system may check to see if a trajectory of the vehicle provided by the first computing system intersects with a trajectory of an object determined by the second computing system and if the object and the vehicle meet at the intersection at the same time (or a window of time). In some cases, to validate a trajectory, the second computing system may perform one or more collision checking operations based on one or more of direct kinematic assumptions of travel and/or predictions of motion as determined by one or more additional techniques.

As described above, in some cases, the second computing system validates a trajectory based on whether a first time associated with a predicted collision for the trajectory falls outside of a threshold time period. In some cases, the threshold time period is determined based on an estimated time associated with receiving a new primary trajectory from the first computing system. In some cases, the threshold time period is determined based on an estimated time associated with receiving a new primary trajectory from the first computing system as well as a buffer time period. The buffer time period may be determined based on a classification of the object with which the vehicle is predicted to collide (e.g., based on whether the object is a pedestrian, based on whether the object is a moving and/or dynamic object, based on whether the object is a static object, and/or the like), a speed of the object, a speed of the vehicle, a direction of the vehicle's movement, a speed of the object, a direction of the object's movement, and/or one or more features (e.g., weather conditions, road safety features, and/or the like) of the vehicle environment. In some cases, the threshold time period is determined based on at least one of a speed of the vehicle, an environment feature of an environment of the vehicle, a deceleration profile of the vehicle, a time-to-collision measure, a distance-to-collision measure, or a classification of an object associated with a predicted collision.

In some cases, if the second computing system determines that the trajectory is predicted to lead to a collision with an object in the vehicle environment, the second computing system may determine the threshold time period based on one or more features of the object. In some cases, the second computing system may determine the threshold time based on a speed of the vehicle, a direction of the vehicle's movement, a speed of the object, and/or a direction of the object's movement. For example, if the vehicle is moving faster toward the object toward the object, the second computing system may determine a shorter threshold time period. As another example, if the vehicle is moving faster away from the object, the second computing system may determine a longer threshold time period. As a further example, if the object is moving faster toward the object toward the object, the second computing system may determine a shorter threshold time period. As an additional example, if the object is moving faster away from the object, the second computing system may determine a longer threshold time period.

In some cases, the second computing system may determine the threshold time period based on a classification of the object with which the vehicle is predicted to collide. For example, in some cases, if the object is a pedestrian, the second computing system may determine a longer threshold time period. As another example, if the object is a dynamic (e.g., moving) object, the second computing system may determine a longer threshold time period. As an additional example, if the object is a reactive object (e.g., an object that is expected to be able to react to the vehicle's movements), the second computing system may determine a longer threshold time period. As a further example, if the object is a static and/or non-reactive object, the second computing system may determine a shorter threshold time period.

In some cases, the second computing system may determine the threshold time period based on one or more features of the vehicle environment. For example, in some cases, if the weather conditions make the vehicle environment more hazardous, the second computing system may determine a longer threshold time period. As another example, in some cases, if the roadway conditions make the vehicle environment more hazardous, the second computing system may determine a longer threshold time period. As a further example, in some cases, if the traffic conditions make the vehicle environment more hazardous, the second computing system may determine a longer threshold time period. As an additional example, if the time of day makes it more likely that other drivers and/or objects may act in an unresponsive, the second computing system may determine a longer threshold time period.

In some cases, the techniques described herein include determining a recommended trajectory for the vehicle using the second computing system based on the primary trajectory and the alternative trajectory provided by the first computing system. In some cases, the second computing system is configured to select whether to recommend the primary trajectory, the alternative trajectory, or neither trajectory for the vehicle. In some cases, the second computing system is configured to select an optimal trajectory for the vehicle to increase the likelihood that the vehicle is operated in compliance with relevant traffic regulations and avoids collision with other objects in the vehicle environment. In some cases, the second computing device can modify a trajectory longitudinally but only the first computing device can modify the trajectory both longitudinally and laterally.

In some cases, if the second computing system determines that the primary trajectory is predicted to lead to collision and the alternative trajectory is not predicted to lead to collision, the second computing system recommends that the vehicle is controlled based on the alternative trajectory until a new primary trajectory is received from the first computing system. In some cases, if the second computing system determines that both the primary trajectory and the alternative trajectory are predicted to lead to collision, the second computing system recommends controlling the vehicle based on a stopping trajectory that is configured to lead the vehicle to stop.

In some cases, the second computing system may determine that the primary trajectory is predicted to lead to collision at a first time in the future. In some of such cases, the second computing system may then determine whether the first time is outside of a threshold time period. In some cases, based on (e.g., in response to) determining that the first time is outside of the threshold time period, the second computing system recommends that the vehicle is controlled based on the primary trajectory despite the predicted collision. In some cases, based on determining that the first time is inside the threshold time period, the second computing system recommends that the vehicle is controlled based on the alternative trajectory, because the primary trajectory is predicted to lead to a sufficiently imminent collision.

In some cases, the second computing system may provide a message to the first computing system indicating an error with a trajectory provided by the first computing system. For example, if the second computing system determines that a collision is estimated to occur far enough in the future that the vehicle does not need to brake immediately (e.g., more than a threshold amount of time away) if the vehicle proceeds along a primary trajectory provided by the first computing system, the second computing system may send a message to the first computing system to warn the first computing system. This may allow the first computing system to adjust the primary trajectory before the collision occurs.

In some cases, the techniques described herein include controlling the vehicle based on the trajectory adopted by the second computing system. In some cases, subsequent to selecting the trajectory using the second computing system, a system controller component controls the vehicle based on that optimal trajectory. In some cases, controlling the vehicle based on the optimal trajectory is configured to improve the safety of occupants of an autonomous vehicle that incorporates the techniques discussed herein. Moreover, the techniques may improve the efficiency of vehicle, such as an autonomous vehicle, in accomplishing a mission such as delivering passengers and/or cargo, surveying a region, or the like.

In some cases, the second computing system may select the trajectory used to maintain control of the vehicle based on a selected trajectory until a signal is received to release control from the selected trajectory. For example, the second computing system may transition to the alternative trajectory at any time, if needed, and refrain from transitioning back to another trajectory (e.g., a new primary trajectory provided by the first computing system) until a signal is received to release control to the other trajectory. To illustrate, if the second computing system selects an alternative due to a primary trajectory being associated with a collision, control of the vehicle may be maintained along the alternative trajectory until a signal is received from a teleoperations system (e.g., system associated with an operator) to release control to another trajectory. By doing so, the vehicle may avoid frequent changes between trajectories.

In some cases, the techniques and/or systems discussed herein may enhance safety of passengers in a vehicle and/or other individuals in proximity to the vehicle. For example, a second computing system may detect an error in a trajectory provided by a first computing system and control a vehicle to safely decelerate, stop, and/or perform another maneuver to avoid a collision. In some cases, the second computing system may operate relatively independent from the first computing system, so that another form of evaluation occurs to avoid a collision. For instance, the second computing system may independently detect an object in proximity to the vehicle and/or evaluate a trajectory generated by the first computing system. Further, in some cases, the second computing system may be a higher integrity (e.g., more verifiable) and/or less complex system than the first computing system. For instance, the second computing system may be designed to process less data, include a shorter processing pipeline than the first computing system, operate according to techniques that are more easily verifiable than the techniques of the first computing system, and so on.

In some cases, the techniques described herein increase the redundancy of a vehicle computing device by equipping the device with two computing systems for trajectory validation. In some cases, if one of those systems fails, the other can take over, which increases the reliability of the vehicle computing device.

In some cases, the techniques described herein increase the efficiency of a vehicle computing device by enabling a first computing system to generate trajectories at a lower frequency. In some cases, because at each iteration the first computing system provides two trajectories both of which are validated, the first computing system may need to validate new trajectories less often, which decrease computational load on the first computing system and thus makes the vehicle computing device more efficient.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 illustrates an example environment 100 in which the techniques described herein may be implemented. As depicted in FIG. 1, the environment 100 includes a vehicle 102 and an object 120. As further depicted in FIG. 1, the vehicle 102 is associated with a primary trajectory 130 and an alternative trajectory 132. The current position of the object 120 intersects with the primary trajectory 130 but not with the secondary trajectory 132.

The primary trajectory 130 and the alternative trajectory 132 may be generated using one or more sensors 108 and/or one or more computing devices 110 of the vehicle. According to the techniques discussed herein, data gathered by the vehicle(s) 102 may include sensor data from sensor(s) 108 of the vehicle(s) 102. For example, the sensor(s) 108 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). The sensor(s) 108 may generate sensor data, which may be received by computing device(s) 110 associated with the vehicle(s) 102. However, in other examples, some or all of the sensor(s) 108 and/or computing device(s) 110 may be separate from and/or disposed remotely from the vehicle(s) 102 and data capture, processing, commands, and/or controls may be communicated to/from the vehicle(s) 102 by one or more remote computing devices via wired and/or wireless networks.

Computing device(s) 110 may comprise a memory 112 storing a perception component 114, a planning component 116, one or more controller 138, and/or a trajectory validation system 118. Note that, in some examples, the computing device(s) 110 may additionally or alternatively store a localization component, which may comprise software and/or hardware system(s) for determining a pose (e.g., position and/or orientation) of the vehicle(s) 102 relative to one or more coordinate frames (e.g., relative to the environment, relative to a roadway, relative to an inertial direction of movement associated with the autonomous vehicle). The localization component may output at least part of this data to the perception component 114, which may output at least some of the localization data and/or use the localization data as a reference for determining at least some of the perception data.

The perception component 114 may determine what is in the environment surrounding the vehicle(s) 102 (or during a simulation what is in the simulated environment) and the planning component 116 may determine how to operate the vehicle(s) 102 according to information received from the localization component and/or the perception component 114. The localization component, the perception component 114, and/or the planning component 116 may include one or more machine-learned (ML) models and/or other computer-executable instructions.

In some cases, the planning component 116 is configured to generate one or more trajectories (e.g., the primary trajectory 130, an alternative trajectory 132, and/or the like). The trajectory validation system 118 may be configured to validate the trajectories provided by the planning component 116, select an optimal trajectory, and provide the optimal trajectory to the system controller(s) 138. The system controller(s) 138 may then be configured to control the vehicle 102 based on the selected trajectory.

In some cases, to select an optimal trajectory, trajectory validation system 118 performs the operations of the process 160, as depicted in FIG. 1. However, while various implementations described herein describing validating and selecting trajectories using trajectory validation system 118, a person of ordinary skill in the relevant technology will recognize that other components of a vehicle may also be used to validate and select trajectories. Moreover, all of the operations described herein as being performed by trajectory validation system 118 can be performed by other components of a vehicle.

As depicted in FIG. 1, at operation 140, trajectory validation system 118 receives the primary trajectory 130 and the alternative trajectory 132. At operation 142, the trajectory validation system 118 determines that the primary trajectory 130 is predicted to lead to collision at a first time. For example, the second computing system may determine that the trajectory 130 intersects with a trajectory of an object (e.g., object 120) (e.g., as determined by trajectory validation system 118) at the first time and/or that the object and the vehicle 102 meet at the intersection at the first time. In some cases, the trajectory validation system 118 may determine that the vehicle 102 would collide with an object (e.g., with object 120) at the first time if the vehicle is maintained along the primary trajectory 130. Such collision checking may be based on either one or more of direct kinematic assumptions of travel and/or predictions of motion as determined by one or more additional techniques. In some cases, the first time is a point in time in the future. In some cases, the first time is a window of time in the future.

At operation 144, trajectory validation system 118 determines whether the first time is in a threshold time period. In some cases, the threshold time period is determined based on an estimated time associated with receiving a new primary trajectory. In some cases, the threshold time period is determined based on an estimated time associated with receiving a new primary trajectory as well as a buffer time period. The buffer time period may be determined based on a classification of the object with which the vehicle is predicted to collide (e.g., based on whether the object is a pedestrian or a moving/dynamic object), a speed of the object, a speed of the vehicle 102, a direction of the vehicle's movement, a speed of the object, a direction of the object's movement, one or more features (e.g., weather conditions, road safety features, and/or the like) of the vehicle's environment 100, and/or the like.

In some cases, trajectory validation system 118 may determine the threshold time period based on one or more features of the object with which the vehicle 102 is predicted to collide. In some cases, trajectory validation system 118 may determine the threshold time based on a speed of the vehicle 102, a direction of the vehicle's movement, a speed of the object, and/or a direction of the object's movement. In some cases, trajectory validation system 118 may determine the threshold time period based on a classification of the object with which the vehicle 102 is predicted to collide. For example, in some cases, if the object is a pedestrian, trajectory validation system 118 may determine a longer threshold time period. In some cases, trajectory validation system 118 may determine the threshold time period based on one or more features of the vehicle environment 100. For example, in some cases, if the weather conditions make the vehicle environment more hazardous, trajectory validation system 118 may determine a longer threshold time period. In any such example, thresholds may be determined to improve the safe operation of the vehicle while attempting to account for false positives.

At operation 146, trajectory validation system 118 controls the vehicle 102 based on the primary trajectory 130 based on (e.g., in response to) determining that the first time is outside the threshold time period. In some cases, trajectory validation system 118 provides the primary trajectory 130 to the controller(s) 138 to enable the controller(s) 138 to control the vehicle based on the primary trajectory 130.

At operation 148, trajectory validation system 118 determines whether to validate the alternative trajectory 132 based on (e.g., in response to) determining that the first time is inside the threshold time period. In some cases, evaluating a trajectory by the trajectory validation system 118 includes determining whether the trajectory is predicted to lead to collision and determining whether to validate the trajectory based on whether the trajectory is predicted to lead to collision. In some cases, a trajectory is validated if the trajectory is predicted to not lead to collision. In some cases, a trajectory is not validated (e.g., rejected) if the trajectory is predicted to lead to collision.

In some cases, evaluating a trajectory by the trajectory validation system 118 includes determining whether the trajectory is predicted to lead to collision within a threshold time period and determining whether to validate the trajectory based on whether the trajectory is predicted to lead to collision within the threshold time period. In some cases, a trajectory is validated if the trajectory is predicted to not lead to collision within the threshold time period. In some cases, a trajectory is not validated (e.g., rejected) if the trajectory is predicted to lead to collision within the threshold time period.

At operation 150, trajectory validation system 118 controls the vehicle 102 based on the alternative trajectory 132 based on (e.g., in response to) determining that the first time is inside the threshold time period and the alternative trajectory 132 is validated. In some cases, trajectory validation system 118 provides the alternative trajectory 132 to the controller(s) 138 to enable the controller(s) 138 to control the vehicle based on the alternative trajectory 132.

At operation 152, trajectory validation system 118 controls the vehicle 102 based on a stopping trajectory based on (e.g., in response to) determining that the first time is inside the threshold time period and the alternative trajectory 132 is not validated. In some cases, trajectory validation system 118 provides the stopping trajectory to the controller(s) 138 to enable the controller(s) 138 to control the vehicle based on the stopping trajectory. In some cases, the stopping trajectory is configured to lead the vehicle to stop. In some cases, the alternative trajectory 132 also leads the vehicle to stop, but is different from the stopping trajectory.

In some cases, the trajectory validation system 118 generates a stopping profile for the alternative trajectory 132 that represents a stopping point for the alternative trajectory 132, a stopping path for the alternative trajectory 132, and/or a deceleration profile for the alternative trajectory 132. In some cases, the trajectory validation system 118 generates the stopping trajectory by generating at least one of the following along the primary trajectory 130: a stopping point, a stopping path, or a deceleration profile. In some cases, the trajectory validation system 118 generates a stopping profile for a trajectory that is configured to cause the vehicle to stop. The stopping profile of a trajectory may represent at least one of a stopping point, a stopping path, or a deceleration profile.

Figure 2:
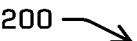
FIG. 2 is a flowchart diagram of an example process for determining whether to accept or reject a first trajectory.

FIG. 2 is a flowchart diagram of an example process 200 for determining whether to accept or reject a first trajectory (e.g., a primary trajectory, such as the primary trajectory 130 of FIG. 1, or an alternative trajectory, such as the alternative trajectory 132 of FIG. 1). As depicted in FIG. 2, at operation 202, process 200 includes receiving the first trajectory. In some cases, a second computing system (e.g., trajectory validation system 118 of FIG. 1) receives the first trajectory from a first computing system (e.g., planning component 116 of FIG. 1).

At operation 204, the process 200 includes validating the first trajectory. In some cases, validating the first trajectory includes validating the first trajectory at frequent time intervals until a new primary trajectory is received. In some cases, validating the first trajectory includes validating the first trajectory at each time at which processing resources are available to validate the first trajectory, until a new primary trajectory is received. In some cases, validating the first trajectory is performed by the second computing system. In some cases, the second computing system may perform one or more operations to validate the trajectory. The second computing system may determine that a trajectory is valid and thus validate the trajectory if the second computing system determines that controlling the vehicle based on the trajectory is likely to satisfy one or more safety and/or one or more effectiveness conditions. The second computing system may determine that a trajectory is invalid and thus reject the trajectory if the second computing system determines that controlling the vehicle based on the trajectory is likely to fail one or more safety and/or one or more effectiveness conditions. For example, the second computing system may determine that a trajectory is invalid and thus reject and/or modify the trajectory if the system determines that the trajectory is likely to lead to collision.

In some cases, to validate a trajectory, the second computing system may check to see if a trajectory was generated less than a threshold amount of time ago, if the trajectory is consistent with a current or previous pose of the vehicle (e.g., the trajectory controls the vehicle to be positioned at a location that is possible given the current pose of the vehicle), if the trajectory is compatible with a capability of the vehicle (e.g., steering limits, acceleration limits, etc.), and so on. Further, the second computing system may check to see if a trajectory is associated with a collision. For example, the second computing system may check to see if a trajectory of the vehicle provided by the first computing system intersects with a trajectory of an object determined by the second computing system and if the object and the vehicle meet at the intersection at the same time (or a window of time).

At operation 206, the process 200 includes determining, based on each validation determination output generated by the continuous validation process, whether the first trajectory is both valid and predicted to avoid collision. For example, the second computing system may determine whether the first trajectory is predicted to collision if the first trajectory of intersects with a trajectory of an object (e.g., as determined by the second computing system) and if the object and the vehicle meet at the intersection at the same time (or at the same window of time).

At operation 208, the process 200 includes selecting the first trajectory based on (e.g., in response to) determining that the first trajectory is valid and predicted to not lead to collision. In some cases, based on determining that the first trajectory is predicted to not lead to collision, the second computing system provides the first trajectory to one or more vehicle controllers to enable the controller(s) to control the vehicle based on the first trajectory.

At operation 210, the process 200 includes determining whether a collision time associated with the predicted collision falls outside of a threshold period of time based on (e.g., in response to) determining that the first trajectory is valid and/or predicted to lead to collision. In some cases, the threshold time period is determined based on an estimated time associated with receiving a new primary trajectory from the first computing system. In some cases, the threshold time period is determined based on an estimated time associated with receiving a new primary trajectory from the first computing system as well as a buffer time period. The buffer time period may be determined based on a classification of the object with which the vehicle is predicted to collide (e.g., based on whether the object is a pedestrian or a moving/dynamic object), a speed of the object, a speed of the vehicle, a direction of the vehicle's movement, a speed of the object, a direction of the object's movement, and/or one or more features (e.g., weather conditions, road safety features, and/or the like) of the vehicle environment.

In some cases, the second computing system may determine the threshold time period based on a classification of the object with which the vehicle is predicted to collide. For example, in some cases, if the object is a pedestrian, the second computing system may determine a longer threshold time period. As another example, if the object is a dynamic (e.g., moving) object, the second computing system may determine a longer threshold time period. As an additional example, if the object is a reactive object (e.g., an object that is expected to be able to react to the vehicle's movements), the second computing system may determine a longer threshold time period. As a further example, if the object is a static and/or non-reactive object, the second computing system may determine a shorter threshold time period.

In some cases, based on (e.g., in response to) determining that the first trajectory is predicted to lead to collision but the collision time falls outside of the threshold time period, the process 200 returns to operation 208 to control the vehicle based on the first trajectory. In some cases, based on (e.g., in response to) determining that the first trajectory is predicted to lead to collision but the collision time falls outside of the threshold time period, the second computing system provides the first trajectory to one or more vehicle controllers to enable the controller(s) to control the vehicle based on the first trajectory. In some cases, based on (e.g., in response to) determining that the collision time is outside of the threshold time period, the second computing system recommends that the vehicle is controlled based on the primary trajectory despite the predicted collision. In some cases, based on determining that the first time is inside the threshold time period, the second computing system recommends that the vehicle is controlled based on the alternative trajectory, because the primary trajectory is predicted to lead to a sufficiently imminent collision.

At operation 212, the process 200 includes rejecting the first trajectory based on the first trajectory based on (e.g., in response to) determining that the first trajectory is predicted to lead to collision and that the collision time falls inside the threshold time period. In some cases, based on determining that the collision time is inside the threshold time period, the second computing system recommends that the vehicle is controlled based on a different trajectory (e.g., an alternative trajectory), because the first trajectory is predicted to lead to a sufficiently imminent collision. Upon such a rejection, the process may proceed to one or more safe maneuvers as discussed in detail herein.

Figure 3:
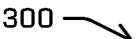
FIG. 3 is a flowchart diagram of an example process for selecting one of the trajectories received from a first computing system by a second computing system.
Figure 3:
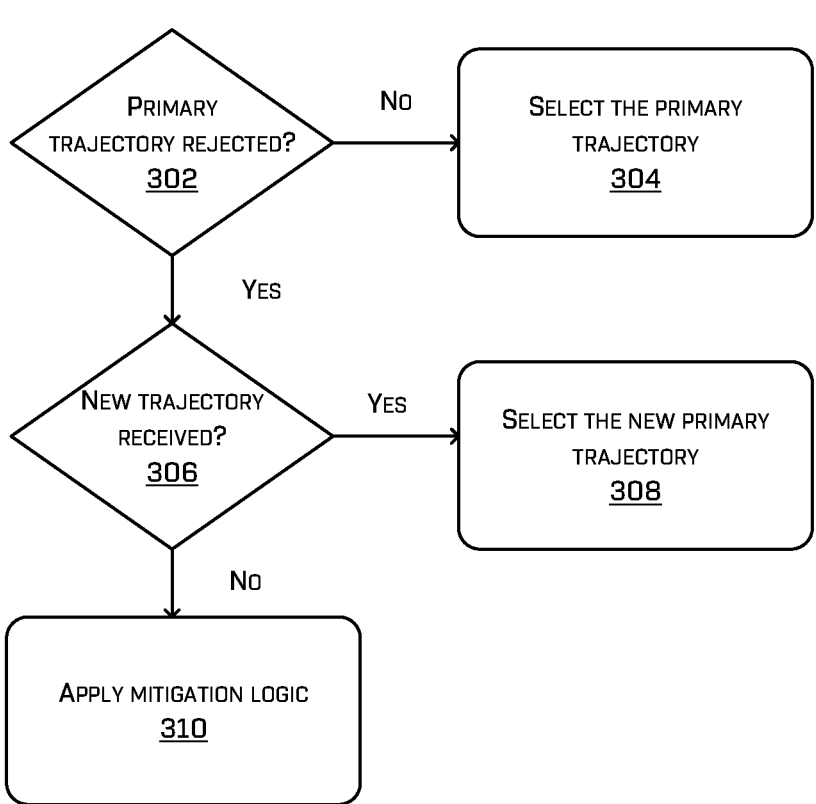

FIG. 3 is a flowchart diagram of an example process 300 for operations of a second computing system to select one of the trajectories received from a first computing system. As depicted in FIG. 3, at operation 302, the second computing system determines whether to validate a primary trajectory. The primary trajectory may be a trajectory that is determined by the first computing system to be the optimal trajectory for the vehicle to select.

To validate the primary trajectory, the second computing system may perform one or more operations to evaluate (or validate) the primary trajectory. For example, the second computing system may check to see if the primary trajectory was generated less than a threshold amount of time ago, if the primary trajectory is consistent with a current or previous pose of the vehicle (e.g., the primary trajectory controls the vehicle to be positioned at a location that is possible given the current pose of the vehicle), if the primary trajectory is compatible with a capability of the vehicle (e.g., steering limits, acceleration limits, etc.), and so on. Further, the second computing system may check to see if the primary trajectory is predicted to lead to collision.

At operation 304, the second computing system selects the primary trajectory based on (e.g., in response to) determining to validate the primary trajectory. In some cases, based on (e.g., in response to) determining that the primary trajectory is valid, the second computing system provides the primary trajectory to one or more vehicle controllers to enable the controller(s) to control the vehicle based on the primary trajectory.

At operation 306, the second computing system determines whether a new primary trajectory is received from the first computing system subsequent to the primary trajectory processed at operation 302, based on (e.g., in response to) determining to reject the primary trajectory. In some cases, the first computing system is configured to over time (e.g., periodically) provide new primary trajectories for the vehicle. In some cases, the first computing system is configured to over time (e.g., periodically) provide trajectory sets for the vehicle, where each trajectory set includes a new primary trajectory and a new alternative trajectory. In some cases, the first computing system is configured to over time (e.g., periodically) provide trajectory sets for the vehicle, where each trajectory set includes a new primary trajectory, a new alternative trajectory, and a new stopping trajectory.

At operation 308, the second computing system selects the new primary trajectory based on (e.g., in response to) determining that a new primary trajectory is received and that the new primary trajectory is valid. In some cases, based on (e.g., in response to) determining that a new primary trajectory is received, the second computing system provides the new primary trajectory to one or more vehicle controllers to enable the controller(s) to control the vehicle based on the new primary trajectory.

At operation 310, the second computing system determines applies a mitigation logic based on (e.g., in response to) determining that the primary trajectory is invalid and no new primary trajectory is received. In some cases, to apply the mitigation logic, the second computing system determines a probability that each trajectory of one or more additional trajectories leads to collision and chooses the additional trajectory having the least probability. The additional trajectories may include an alternative trajectory and/or a stopping trajectory. The stopping trajectory may be generated by determining a stopping point along the primary trajectory. In some cases, before applying the mitigation logic based on an optimal additional trajectory (e.g., based on the alternative trajectory or the stopping trajectory), the second computing system may longitudinally modify the additional trajectory.

Figure 4:
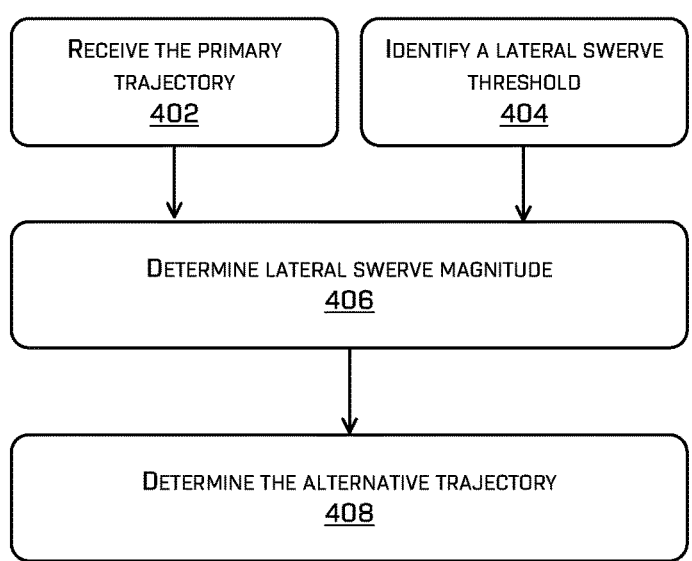
FIG. 4 is a flowchart diagram of an example process for determining an alternative trajectory based on a primary trajectory.

FIG. 4 is a flowchart diagram of an example process 400 for determining an alternative trajectory based on a primary trajectory. As depicted in FIG. 4, at operation 402, the process 400 includes receiving the primary trajectory. In some cases, a first computing system generates and/or validates the primary trajectory and provides the primary trajectory to a second computing system. The primary trajectory may be a trajectory that is determined by the first computing system to be the optimal trajectory for the vehicle to select.

At operation 404, the process 400 includes identifying (e.g., determining or receiving) a lateral swerve threshold. In some cases, the lateral swerve threshold is a maximum amount of lateral swerve that may be applied to the primary trajectory to generate the alternative trajectory. In some cases, two lateral swerve thresholds are identified: a left lateral swerve direction that is a maximum amount of leftward lateral swerve that may be applied to the primary trajectory to generate the alternative trajectory, and a rightward lateral swerve direction that is a maximum amount of rightward lateral swerve that may be applied to the primary trajectory to generate the alternative trajectory. In some cases, for each time segment (e.g., second) in a future time period, a separate set of one or more lateral swerve thresholds is identified. For example, the first second in the future may be associated with a first left lateral swerve direction and a first right lateral swerve direction, the second in the future may be associated with a second left lateral swerve direction and a second right lateral swerve direction, and so on. This may be because lane widths is expected to change as a vehicle traverses along the primary trajectory.

In some cases, the lateral swerve magnitude associated with the alternative trajectory is not allowed to exceed the lateral swerve threshold. For example, the threshold may be determined based on a distance between an estimated position of the vehicle when following the primary trajectory and an estimated position of a lane marking. In some cases, the lateral swerve magnitude associated with the alternative trajectory is determined in such a way that, when the vehicle follows the alternative trajectory, the vehicle is expected to remain within the lane at which the vehicle is traveling. In some cases, the lateral swerve magnitude associated with the alternative trajectory is determined in such a way that, when the vehicle follows the alternative trajectory, the vehicle is expected to remain within the lane at which the vehicle is traveling and have a threshold distance from the lane markings on one or both sides of the vehicle. In some cases, the lateral swerve threshold applied to the lateral swerve magnitude of the alternative trajectory is determined based on (e.g., based on a summation of): (i) a distance between an estimated position of the vehicle when following the primary trajectory and an estimated position of a lane marking, and (ii) a safety buffer distance.

At operation 406, the process 400 includes determining a lateral swerve magnitude to apply to the primary trajectory to generate the alternative trajectory. In some cases, to determine the lateral swerve magnitude, a system (e.g., the first computing system) determines a maximal amount of lateral swerve that: (i) when applied to the primary trajectory, still ensures that the resulting trajectory is valid, and (ii) is below the lateral swerve threshold. For example, if the system determines that the primary trajectory would still be validated if the primary trajectory laterally swerves to the right for up to a units and to the left for up to b units, a>b, a falls below or meets a right swerve threshold $T_R$, and b falls below or meets a left swerve threshold $T_L$, then the first computing system may determine that the maximum amount of permissible lateral swerve is a units.

In some cases, subsequent to determining the maximum amount of permissible lateral offset threshold for the primary trajectory, the system determines the alternative trajectory by laterally swerving the primary trajectory by a lateral swerve magnitude that is determined based on (e.g., equal to) the maximum amount of permissible lateral swerve and in a lateral swerve direction that is determined based on a direction associated with the maximum amount. For example, if the system determines that the primary trajectory would still be validated if the primary trajectory laterally swerves to the right for up to a units and to the left for up to b units, a>b, a falls below or meets a right swerve threshold $T_R$, and b falls below or meets a left swerve threshold $T_L$, then the system may determine the alternative trajectory is generated by laterally swerving the primary trajectory by a units to the right.

At operation 408, the process 400 includes determining the alternative trajectory based on the lateral swerve magnitude. For example, in some cases, to determine the alternative trajectory, a system (e.g., the first computing system) laterally swerves the primary trajectory by the lateral swerve magnitude. In some cases, the alternative trajectory is substantially parallel to the primary trajectory but is positioned to one side of the primary trajectory based on a lateral swerve that is determined based on a lateral swerve magnitude.

Figure 5:
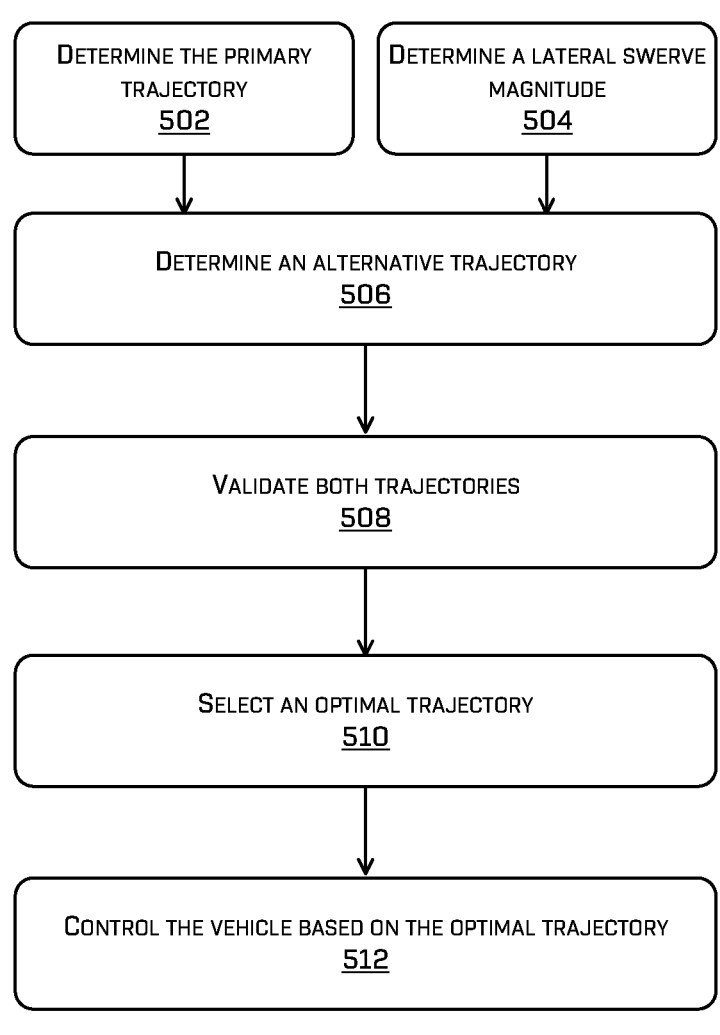
FIG. 5 is a flowchart diagram of an example process for controlling a vehicle based on at least one of a primary trajectory or an alternative trajectory.

FIG. 5 is a flowchart diagram of an example process 500 for controlling a vehicle based on at least one of a primary trajectory or an alternative trajectory. As depicted in FIG. 5, at operation 502, the process 500 includes determining a primary trajectory. The primary trajectory may be a trajectory that is determined by the first computing system to be the optimal trajectory for the vehicle to select.

At operation 504, the process 500 includes determining a lateral swerve magnitude. In some cases, to determine the lateral swerve magnitude, a system (e.g., the first computing system) determines a maximal amount of lateral swerve that: (i) when applied to the primary trajectory, still ensures that the resulting trajectory is valid, and (ii) is below the lateral swerve threshold. For example, if the system determines that the primary trajectory would still be validated if the primary trajectory laterally swerves to the right for up to a units and to the left for up to b units, a>b, a falls below or meets a right swerve threshold $T_R$, and b falls below or meets a left swerve threshold $T_L$, then the first computing system may determine that the maximum amount of permissible lateral swerve is a units.

At operation 506, the process 500 includes determining an alternative trajectory based on the primary trajectory and the lateral swerve threshold. In some cases, to determine the alternative trajectory, a system (e.g., the first computing system) laterally swerves the primary trajectory by the lateral swerve magnitude. In some cases, the alternative trajectory is substantially parallel to the primary trajectory but is positioned to one side of the primary trajectory based on a lateral swerve that is determined based on a lateral swerve magnitude.

At operation 508, the process 500 includes validates the primary trajectory and the alternative trajectory. In some cases, to validate a trajectory, a second computing system may check to see if a trajectory was generated less than a threshold amount of time ago, if the trajectory is consistent with a current or previous pose of the vehicle (e.g., the trajectory controls the vehicle to be positioned at a location that is possible given the current pose of the vehicle), if the trajectory is compatible with a capability of the vehicle (e.g., steering limits, acceleration limits, etc.), and so on. Further, the second computing system may check to see if a trajectory is associated with a collision. For example, the second computing system may check to see if a trajectory of the vehicle provided by the first computing system intersects with a trajectory of an object determined by the second computing system and if the object and the vehicle meet at the intersection at the same time (or a window of time). That is, the second computing system may determine if the vehicle would collide with an object if the vehicle is maintained along the trajectory provided by the first computing system. Such collision checking may be based on either one or more of direct kinematic assumptions of travel and/or predictions of motion as determined by one or more additional techniques.

At operation 510, the process 500 includes selecting an optimal trajectory based on the trajectory validation results obtained at operation 508. In some cases, if the primary trajectory is validated, the primary trajectory is selected as the optimal trajectory. In some cases, if the primary trajectory is rejected but the secondary trajectory is validated, the alternative trajectory is selected as the optimal trajectory. In some cases, if the primary trajectory and the alternative trajectory are both rejected, then a stopping trajectory is selected as the optimal trajectory.

At operation 512, the process 200 includes controlling the vehicle based on the selected optimal trajectory. In some cases, a second computing system provides the optimal trajectory to one or more vehicle controllers to enable the controller(s) to control the vehicle based on the optimal trajectory. In some cases, subsequent to selecting the trajectory using the second computing system, a system controller component controls the vehicle based on that optimal trajectory. In some cases, controlling the vehicle based on the optimal trajectory is configured to improve the safety of occupants of an autonomous vehicle that incorporates the techniques discussed herein. Moreover, the techniques may improve the efficiency of vehicle, such as an autonomous vehicle, in accomplishing a mission such as delivering passengers and/or cargo, surveying a region, or the like.

Figure 6:
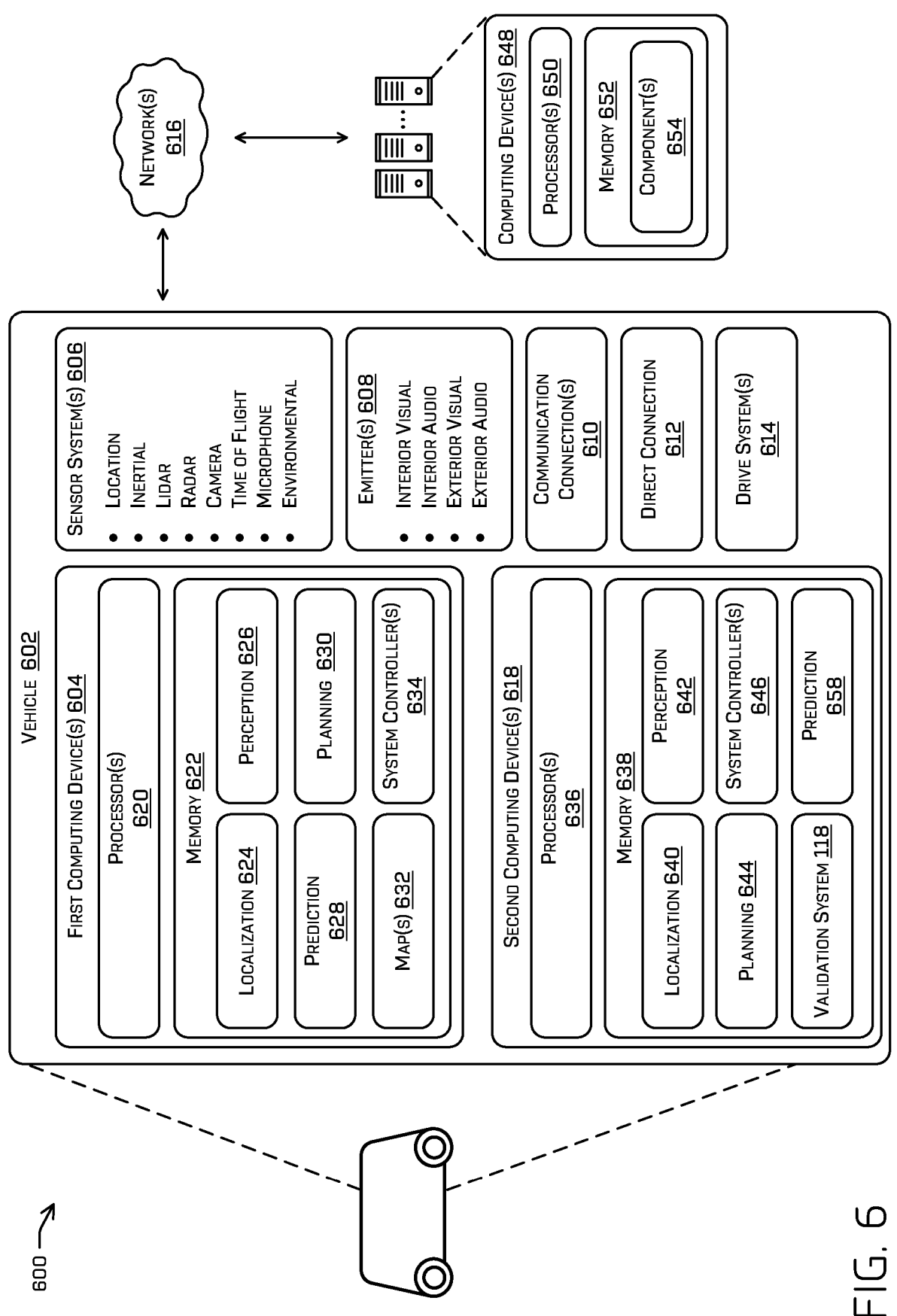
FIG. 6 is a block diagram of an example system for implementing the techniques described herein.

FIG. 6 is a block diagram of an example system 600 for implementing the techniques described herein. In at least one example, the system 600 can include a vehicle 602. In the illustrated example system 600, the vehicle 602 is an autonomous vehicle; however, the vehicle 602 can be any other type of vehicle.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 602 can include one or more first computing devices 604, one or more sensor systems 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. The one or more sensor systems 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the first computing device(s) 604.

The vehicle 602 can also include emitter(s) 608 for emitting light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include communication connection(s) 610 that enable communication between the vehicle 602 and one or more other local or remote computing device(s) (e.g., a remote teleoperation computing device) or remote services. For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the first computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include the sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The vehicle 602 can include one or more second computing devices 618 to provide redundancy, error checking, and/or validation of determinations and/or commands determined by the first computing device(s) 604.

By way of example, the first computing device(s) 604 may be considered to be a primary system, while the second computing device(s) 618 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 604 can include one or more processors 620 and memory 622 communicatively coupled with the one or more processors 620. In the illustrated example, the memory 622 of the first computing device(s) 604 stores a localization component 624, a perception component 626, a prediction component 628, a planning component 630, a maps component 632, and one or more system controllers 634. Though depicted as residing in the memory 622 for illustrative purposes, it is contemplated that the localization component 624, the perception component 626, the prediction component 628, the planning component 630, the maps component 632, and the one or more system controllers 634 can additionally, or alternatively, be accessible to the first computing device(s) 604 (e.g., stored in a different component of vehicle 602 and/or be accessible to the vehicle 602 (e.g., stored remotely).

In memory 622 of the first computing device 604, the localization component 624 can include functionality to receive data from the sensor system(s) 606 to determine a position of the vehicle 602. For example, the localization component 624 can include and/or request/receive a three-dimensional map of an environment (and/or a map based on semantic objects) and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 626 can use perception algorithms to determine a perception-based bounding box associated with an object in the environment based on sensor data. For example, the perception component 626 can receive image data and classify the image data to determine that an object is represented in the image data. Then, using detection algorithms, the perception component 626 can generate a two-dimensional bounding box and/or a perception-based three-dimensional bounding box associated with the object. The perception component 626 can further generate a three-dimensional bounding box associated with the object. As discussed above, the three-dimensional bounding box can provide additional information such as a location, orientation, pose, and/or size (e.g., length, width, height, etc.) associated with the object.

The perception component 626 can include functionality to store perception data generated by the perception component 626. In some instances, the perception component 626 can determine a track corresponding to an object that has been classified as an object type. For purposes of illustration only, the perception component 626, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 602. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 628 can generate one or more probability maps representing prediction probabilities of possible locations of one or more objects in an environment.

For example, the prediction component 628 can generate one or more probability maps for vehicles, pedestrians, animals, and the like within a threshold distance from the vehicle 602. In some instances, the prediction component 628 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 630 can determine a path for the vehicle 602 to follow to traverse through an environment. For example, the planning component 630 can determine various routes and paths and various levels of detail. In some instances, the planning component 630 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 630 can generate an instruction for guiding the autonomous vehicle along at least a portion of the route from the first location to the second location. In at least one example, the planning component 630 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 630 can alternatively, or additionally, use data from the perception component 626 and/or the prediction component 628 to determine a path for the vehicle 602 to follow to traverse through an environment. For example, the planning component 630 can receive data from the perception component 626 and/or the prediction component 628 regarding objects associated with an environment. Using this data, the planning component 630 can determine a route to travel from a first location (e.g., a current location) to a second location (e.g., a target location) to avoid objects in an environment. In at least some examples, such a planning component 630 may determine there is no such collision free path and, in turn, provide a path which brings vehicle 602 to a safe stop avoiding all collisions and/or otherwise mitigating damage.

The memory 622 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the map(s) 632. That is, the map(s) 632 can be used in connection with the localization component 624, the perception component 626, the prediction component 628, and/or the planning component 630 to determine a location of the vehicle 602, identify objects in an environment, generate prediction probabilit(ies) associated with objects and/or the vehicle 602, and/or generate routes and/or trajectories to navigate within an environment.

In some examples, the one or more maps 632 can be stored on a remote computing device(s) (such as the computing device(s) 648) accessible via network(s) 616. In some examples, multiple maps 632 can be stored based on, for example, a characteristic (e.g., type of entity, time of day, day of week, season of the year, etc.). Storing multiple maps 632 can have similar memory requirements but can increase the speed at which data in a map can be accessed.

In at least one example, the first computing device(s) 604 can include one or more system controller(s) 634, which can be configured to control steering, propulsion, braking, safety, emitters, communication, and other systems of the vehicle 602. These system controller(s) 634 can communicate with and/or control corresponding systems of the drive system(s) 614 and/or other components of the vehicle 602, which may be configured to operate in accordance with a path provided from the planning component 630.

The second computing device(s) 618 can comprise one or more processors 636 and memory 638 including components to verify and/or control aspects of the vehicle 602, as discussed herein. In at least one instance, the one or more processors 636 can be similar to the processor(s) 620 and the memory 638 can be similar to the memory 622. However, in some examples, the processor(s) 636 and the memory 638 may comprise different hardware than the processor(s) 620 and the memory 622 for additional redundancy.

In some examples, the memory 638 can comprise a validation system 118, a localization component 640, a perception component 642, a prediction component 658, a planning component 644, and one or more system controllers 646.

In some examples, the localization component 640 may receive sensor data from the sensor(s) 606 to determine one or more of a position and/or orientation (together a pose) of the autonomous vehicle 602. Here, the position and/or orientation may be relative to point(s) and/or object(s) in an environment in which the autonomous vehicle 602 is located. In examples, the orientation may include an indication of a yaw, roll, and/or pitch of the autonomous vehicle 602 relative to a reference plane and/or relative to point(s) and/or object(s). In examples, the localization component 640 may perform less processing than the localization component 624 of the first computing device(s) 604 (e.g., higher-level localization). For instance, the localization component 640 may not determine a pose of the autonomous vehicle 602 relative to a map, but merely determine a pose of the autonomous vehicle 602 relative to objects and/or surfaces that are detected around the autonomous vehicle 602 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception component 642 can include functionality to detect, identify, classify, and/or track object(s) represented in sensor data. For example, the perception component 642 can perform the clustering operations and operations to estimate or determine connectivity data associated with data points, as discussed herein.

In some examples, the perception component 642 may comprise an M-estimator, but may lack an object classifier such as, for example, a neural network, decision tree, and/or the like for classifying objects. In additional or alternate examples, the perception component 642 may comprise an ML model of any type, configured to disambiguate classifications of objects. By contrast, the perception component 626 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception component 642 (and/or 626) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The prediction component 658 may also process the input data to determine one or more predicted trajectories for an object. For example, based on a current position of an object and a velocity of the object over a period of a few seconds, the prediction component 658 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 644 can include functionality to receive a trajectory from the planning component 630 to validate that the trajectory is free of collisions and/or is within safety margins. In some examples, the planning component 644 can generate a safe stop trajectory (e.g., a trajectory to stop the vehicle 602 with a "comfortable" deacceleration (e.g., less than maximum deceleration)) and in some examples the planning component 644 can generate an emergency stop trajectory (e.g., maximum deceleration with or without steering inputs).

In some examples, the system controller(s) 646 can include functionality to control safety critical components (e.g., steering, braking, motors, etc.) of the vehicle. In this manner, the second computing device(s) 618 can provide redundancy and/or an additional hardware and software layer for vehicle safety.

The vehicle 602 can connect to computing device(s) 648 via the network 616 and can include one or more processors 650 and memory 652 communicatively coupled with the one or more processors 650. In at least one instance, the one or more processors 650 can be similar to the processor(s) 620 and the memory 652 can be similar to the memory 622. In the illustrated example, the memory 652 of the computing device(s) 648 stores a component(s) 654, which may correspond to any of the components discussed herein.

The processor(s) 620, 636, and/or 650 can be any suitable processor capable of executing instructions to process data and perform operations as described herein. By way of example and not limitation, the processor(s) 620, 636, and/or 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622, 638, and/or 652 are examples of non-transitory computer-readable media. The memory 622, 638, and/or 652 can store an operating system and one or more software applications, instructions, programs, and/or data to implement the methods described herein and the functions attributed to the various systems. In various implementations, the memory 622, 638, and/or 652 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 622, 638, and/or 652 can be implemented as a neural network. In some examples, the components in the memory 622, 638, and/or 652 may not include machine learning algorithm to reduce complexity and to be verified and/or certified from a safety standpoint.

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving, from a first computing device, a primary trajectory and an alternative trajectory for an autonomous vehicle, wherein the primary trajectory comprises a first lateral profile and the alternative trajectory comprises a second lateral profile different from the first lateral profile; determining, by a second computing device, that a probability that the primary trajectory will lead to collision between the autonomous vehicle and an object within a threshold time period falls below a probability threshold; and based at least in part on determining that the probability falls below the probability threshold, controlling the autonomous vehicle based on the primary trajectory.

B: The system of paragraph A, the operations further comprising: determining that the primary trajectory will lead to collision at a first time; determining that the first time meets or exceeds the threshold time period; and determining that the probability falls below the probability threshold based on determining that the first time meets or exceeds the threshold time period.

C: The system of paragraph A or B, the operations further comprising: determining the probability based at least in part on at least one of a first speed of the autonomous vehicle, a second speed of the object, a classification of the object, or an environment of the autonomous vehicle.

D: The system of any of paragraphs A-C, wherein the second lateral profile is within a threshold lateral offset from the first lateral profile.

E: The system of any of paragraphs A-D, the operations further comprising: determining probability based at least in part on a predicted trajectory of the object.

F: One or more non-transitory computer-readable media storing computer-executable instructions that, when executed, cause one or more processors to perform operations comprising: receiving, from a first computing device, a first trajectory and a second trajectory, wherein the first trajectory is based on a reference trajectory and the second trajectory deviates from the reference trajectory by less than or equal to a swerve threshold; determining, by a second computing device, whether the first trajectory is predicted to lead to collision; and based at least in part on determining that the first trajectory is predicted to lead to collision, controlling a vehicle based on the second trajectory.

G: The one or more non-transitory computer-readable media of paragraph F, wherein controlling the vehicle comprises: based at least in part on determining that the first trajectory is predicted to lead to collision and that the second trajectory is associated with a least collision probability among a plurality of alternative trajectories, controlling the vehicle based on the second trajectory, wherein the plurality of alternative trajectories comprises the second trajectory and a third trajectory configured to control the vehicle to stop.

H: The one or more non-transitory computer-readable media of paragraph G, the operations further comprising: determining, by the second computing device, the third trajectory by determining a stopping point along the third trajectory.

I: The one or more non-transitory computer-readable media of any of paragraphs F-H, the operations further comprising: controlling the vehicle based on the second trajectory based at least in part on determining that a probability that the first trajectory is predicted to lead to collision within a threshold time period falls below a probability threshold.

J: The one or more non-transitory computer-readable media of paragraph I, the operations further comprising: determining the probability based on at least one of a speed of the vehicle, an environment feature of an environment of the vehicle, a deceleration profile of the vehicle, a time-to-collision measure, a distance-to-collision measure, or a classification of an object associated with a predicted collision.

K: The one or more non-transitory computer-readable media of paragraph I or J, the operations further comprising: determining the probability based on a predicted trajectory associated with an object that is associated with a predicted collision.

L: The one or more non-transitory computer-readable media of any of paragraphs F-K, the operations further comprising: controlling the vehicle based on the second trajectory is performed based at least in part on determining that: a probability that the first trajectory is predicted to lead to collision within a threshold time period falls below a probability threshold, and that a fourth trajectory has not been received from the first computing device after receiving the first trajectory.

M: The one or more non-transitory computer-readable media of any of paragraphs F-L, wherein the second trajectory comprises a stopping profile associated with controlling the vehicle to stop.

N: The one or more non-transitory computer-readable media of any of paragraphs F-M, wherein the second computing device comprises at least one of a kinematics-based model or a dynamics-based model for evaluating whether at least one of the first trajectory or the second trajectory is predicted to intersect with a predicted trajectory of an object at a window of time.

O: The one or more non-transitory computer-readable media of any of paragraphs F-N, further comprising: determining a lane width associated with a lane of the vehicle; and determining the swerve threshold based on the lane width.

P: A method comprising: receiving, from a first computing device, a first trajectory and a second trajectory, wherein the first trajectory is based on a reference trajectory and the second trajectory deviates from the reference trajectory by less than or equal to a swerve threshold; determining, by a second computing device, whether the first trajectory is predicted to lead to collision; and based at least in part on determining that the first trajectory is predicted to lead to collision, controlling a vehicle based on the second trajectory.

Q: The method of paragraph P, wherein controlling the vehicle comprises: based at least in part on determining that the first trajectory is predicted to lead to collision and that the second trajectory is associated with a least collision probability among a plurality of alternative trajectories, controlling the vehicle based on the second trajectory, wherein the plurality of alternative trajectories comprises the second trajectory and a third trajectory configured to control the vehicle to stop.

R: The method of paragraph Q, further comprising: determining, by the second computing device, the third trajectory by determining a stopping point along the third trajectory.

S: The method of any of paragraphs P-R, further comprising: controlling the vehicle based on the second trajectory based at least in part on determining that a probability that the first trajectory is predicted to lead to collision within a threshold time period falls below a probability threshold.

T: The method of paragraph S, further comprising: determining the probability based on at least one of a speed of the vehicle, an environment feature of an environment of the vehicle, a deceleration profile of the vehicle, a time-to-collision measure, a distance-to-collision measure, or a classification of an object associated with a predicted collision.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
   receiving, from a first computing device, a primary trajectory and an alternative trajectory for an autonomous vehicle, wherein the primary trajectory comprises a first lateral profile and the alternative trajectory comprises a second lateral profile different from the first lateral profile, and wherein the alternative trajectory is determined based on the primary trajectory;
   determining, by a second computing device, that a probability that the primary trajectory will lead to collision between the autonomous vehicle and an object within a threshold time period falls below a probability threshold, wherein the threshold time period is determined based at least in part on a time period associated with the first computing device generating a new primary trajectory and includes a buffer time period; and
   based at least in part on determining that the probability falls below the probability threshold, controlling the autonomous vehicle based on the primary trajectory.

2. The system of claim 1, the operations further comprising:
   determining that the primary trajectory will lead to collision at a first time;

33

34 determining that the first time meets or exceeds the threshold time period; and determining that the probability falls below the probability threshold based on determining that the first time meets or exceeds the threshold time period.

3. The system of claim 1, the operations further comprising:

determining the probability that the primary trajectory will lead to collision between the autonomous vehicle and the object within the threshold time period based at least in part on at least one of a first speed of the autonomous vehicle, a second speed of the object, a classification of the object, or an environment of the autonomous vehicle.

4. The system of claim 1, wherein the second lateral profile is within a threshold lateral offset from the first lateral profile.

5. The system of claim 1, the operations further comprising:

determining the probability that the primary trajectory will lead to collision between the autonomous vehicle and the object within the threshold time period based at least in part on a predicted trajectory of the object.

6. One or more non-transitory computer-readable media storing computer-executable instructions that, when executed, cause one or more processors to perform operations comprising:

receiving, from a first computing device, a first trajectory and a second trajectory, wherein the first trajectory is based on a reference trajectory and the second trajectory deviates from the reference trajectory by less than or equal to a swerve threshold, and wherein the second trajectory is determined based on the first trajectory;

determining, by a second computing device, whether the first trajectory is predicted to lead to collision with an object within a threshold time period, wherein the threshold time period is determined based at least in part on a time period associated with the first computing device generating a new trajectory; and based at least in part on determining that the first trajectory is predicted to lead to collision, controlling a vehicle based on the second trajectory.

7. The one or more non-transitory computer-readable media of claim 6, wherein controlling the vehicle comprises:

based at least in part on determining that the first trajectory is predicted to lead to collision with the object within the threshold time period and that the second trajectory is associated with a least collision probability among a plurality of alternative trajectories, controlling the vehicle based on the second trajectory, wherein the plurality of alternative trajectories comprises the second trajectory and a third trajectory configured to control the vehicle to stop.

8. The one or more non-transitory computer-readable media of claim 7, the operations further comprising:

determining, by the second computing device, the third trajectory by determining a stopping point along the third trajectory.

9. The one or more non-transitory computer-readable media of claim 6, the operations further comprising:

controlling the vehicle based on the second trajectory based at least in part on determining that a probability that the first trajectory is predicted to lead to collision within the threshold time period falls below a probability threshold.

10. The one or more non-transitory computer-readable media of claim 9, the operations further comprising:

determining the probability based on at least one of a speed of the vehicle, an environment feature of an environment of the vehicle, a deceleration profile of the vehicle, a time-to-collision measure, a distance-to-collision measure, or a classification of the object.

11. The one or more non-transitory computer-readable media of claim 9, the operations further comprising:

determining the probability based on a predicted trajectory associated with the object.

12. The one or more non-transitory computer-readable media of claim 6, the operations further comprising:

controlling the vehicle based on the second trajectory based at least in part on determining that:

a probability that the first trajectory is predicted to lead to collision within the threshold time period falls below a probability threshold, and that a fourth trajectory has not been received from the first computing device after receiving the first trajectory.

13. The one or more non-transitory computer-readable media of claim 6, wherein the second trajectory comprises a stopping profile associated with controlling the vehicle to stop.

14. The one or more non-transitory computer-readable media of claim 6, wherein the second computing device comprises at least one of a kinematics-based model or a dynamics-based model for evaluating whether at least one of the first trajectory or the second trajectory is predicted to intersect with a predicted trajectory of the object at a window of time.

15. The one or more non-transitory computer-readable media of claim 6, the operations further comprising:

determining a lane width associated with a lane of the vehicle; and determining the swerve threshold based on the lane width.

16. A method comprising:

receiving, from a first computing device, a first trajectory and a second trajectory, wherein the first trajectory is based on a reference trajectory and the second trajectory deviates from the reference trajectory by less than or equal to a swerve threshold, and wherein the second trajectory is determined based on the first trajectory;

determining, by a second computing device, whether the first trajectory is predicted to lead to collision with an object within a threshold time period, wherein the threshold time period is determined based at least in part on a time period associated with the first computing device generating a new trajectory; and based at least in part on determining that the first trajectory is predicted to lead to collision, controlling a vehicle based on the second trajectory.

17. The method of claim 16, wherein controlling the vehicle comprises:

based at least in part on determining that the first trajectory is predicted to lead to collision and that the second trajectory is associated with a least collision probability among a plurality of alternative trajectories, controlling the vehicle based on the second trajectory, wherein the plurality of alternative trajectories comprises the second trajectory and a third trajectory configured to control the vehicle to stop.

18. The method of claim 16, further comprising:

controlling the vehicle based on the second trajectory based at least in part on determining that a probability that the first trajectory is predicted to lead to collision within the threshold time period falls below a probability threshold.

19. The system of claim 1, the operations further comprising:

determining, by the second computing device, that a second probability that the primary trajectory will lead to collision between the autonomous vehicle and the object outside of the threshold time period exceeds the probability threshold; and controlling the autonomous vehicle based on the primary trajectory based at least in part on determining that the probability falls below the probability threshold and the second probability falls above the probability threshold.

20. The one or more non-transitory computer-readable media of claim 6, the operations further comprising:

determining the swerve threshold based on:

a distance between the vehicle and a lane boundary, and a buffer distance.

\* \* \* \* \*